United States Patent
Horiuchi et al.

(10) Patent No.: US 6,671,584 B2
(45) Date of Patent: Dec. 30, 2003

(54) MASS FLOW RATE-MEASURING METHOD AND MASS FLOW RATE CONTROL APPARATUS

(75) Inventors: Toru Horiuchi, Higashimurayama (JP); Kenji Shinozaki, Koshigaya (JP)

(73) Assignee: SMC Kabushiki Kaisha, Tokyo (JP)

(*) Notice: Subject to any disclaimer, the term of this patent is extended or adjusted under 35 U.S.C. 154(b) by 0 days.

(21) Appl. No.: 10/167,598

(22) Filed: Jun. 13, 2002

(65) Prior Publication Data

US 2002/0193911 A1 Dec. 19, 2002

(30) Foreign Application Priority Data

Jun. 13, 2001 (JP) ........................... 2001-178430

(51) Int. Cl.$^7$ ............... G05D 7/00; G01F 1/20
(52) U.S. Cl. ............. 700/282; 73/19.04; 137/14; 137/551
(58) Field of Search ................. 700/282, 281; 73/199, 1.25, 1.26, 861.67, 861.52, 1, 16, 19.04, 30.03; 137/551, 14

(56) References Cited

U.S. PATENT DOCUMENTS

| | | | | |
|---|---|---|---|---|
| 3,665,959 A | * | 5/1972 | Castillon | ............ 173/551 |
| 4,821,557 A | * | 4/1989 | Beeson | ............ 73/1.26 |
| 6,012,474 A | * | 1/2000 | Takamoto et al. | ............ 137/14 |
| 6,546,811 B2 | * | 4/2003 | Fincke | ............ 73/861.63 |

FOREIGN PATENT DOCUMENTS

JP          8-335117          12/1996

* cited by examiner

Primary Examiner—Albert W. Paladini
(74) Attorney, Agent, or Firm—Paul A. Guss

(57) ABSTRACT

The real mass flow rate is calculated for a variety of gases. The variety of gases are classified into a plurality of classifications, and representative discharge coefficient relationships are previously determined for the respective classifications. When an upstream pressure and a temperature are detected for a certain gas on an upstream side of the sonic nozzle, a theoretical mass flow rate is calculated. After the theoretical mass flow rate is calculated, reference is made to a theoretical mass flow rate-discharge coefficient correspondence table recorded in a memory corresponding to the classification of the gas, to determine a discharge coefficient based on the relationship appropriate for the gas type. After the discharge coefficient is selected, a real mass flow rate is determined as a product of the determined discharge coefficient and the theoretical mass flow rate.

9 Claims, 7 Drawing Sheets

FIG. 2

| GAS | SPECIFIC HEAT RATIO (k) | CLASSIFICATION ($\alpha$) |
|---|---|---|
| AIR | k1 | A |
| NITROGEN $N_2$ | k2 | B |
| ARGON Ar | k3 | C |
| TETRAFLUOROETHYLENE $CF_4$ | k4 | D |
| ⋮ | ⋮ | ⋮ |

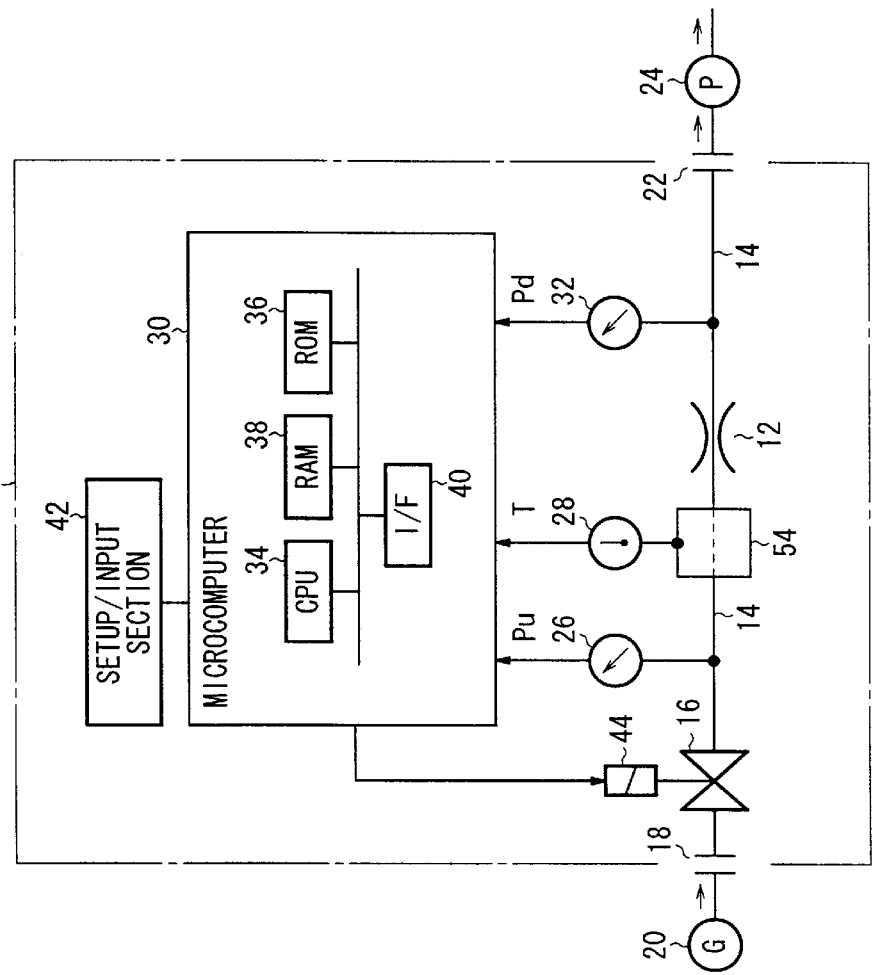

MASS FLOW RATE-MEASURING METHOD AND MASS FLOW RATE CONTROL APPARATUS

BACKGROUND OF THE INVENTION

1. Field of the Invention

The present invention relates to a mass flow rate-measuring method and a mass flow rate control apparatus using an orifice which operates as a sonic nozzle.

2. Description of the Related Art

Generally, it is especially difficult for an orifice to measure a minute flow rate of a fluid which is a gas. Specifically, there is a difference between the real mass flow rate (hereinafter referred to as "Qtr") and the theoretical mass flow rate (hereinafter referred to as "Qth") calculated from respective quantities of state.

Therefore, according to a conventional mass flow rate control apparatus disclosed in Japanese Laid-Open Patent Publication No. 8-335117, the discharge coefficient Cd, which is required to use Qtr=Qth×Cd, is previously determined as a correspondence table Cd=f(Rth). Rth represents the theoretical Reynolds number.

Actually, the theoretical Reynolds number Rth and the theoretical mass flow rate Qth are calculated by detecting the pressure and the temperature upstream of the orifice. The discharge coefficient Cd, which corresponds to the theoretical Reynolds number Rth, is determined with reference to the correspondence table. The real mass flow rate is determined by the expression Qtr=Qth×Cd.

However, the inventor has found out the fact that the value of the discharge coefficient Cd differs depending on the type of the gas.

Therefore, for controlling the mass flow rate corresponding to a plurality of gas types by using the conventional mass flow rate control apparatus, it is necessary to previously store, in the memory, a correspondence table for the discharge coefficient Cd for each of the plurality of gas types. As a result, the memory capacity for storing the correspondence table is increased.

When the conventional mass flow rate control apparatus measures the temperature of he gas, a temperature-detecting element directly contacts the gas in a flow passage. However, the temperature-detecting element may be corroded and become defective depending on the type of the gas, making it impossible to use the mass flow rate control apparatus. The temperature-detecting element arranged in the flow passage may also disturb the flow of the gas.

SUMMARY OF THE INVENTION

It is an object of the present invention to provide a mass flow rate-measuring method and a mass flow rate control apparatus which do not unduly increase the memory capacity for storing a correspondence table, even when the number of gas types is increased.

Another object of the present invention is to provide a mass flow rate control apparatus which does not corrode a temperature-detecting element and which does not disturb the flow of gas in a flow passage.

According to the present invention, a plurality of respective relationships of discharge coefficient values classified by a physical property value of each of gases with respect to theoretical mass flow rates are previously determined. Therefore, an identical discharge coefficient relationship can be used for gas type in which the physical property values of the gases are similar to one another. Accordingly, even when the number of gas types is increased, it is unnecessary to drastically increase the memory capacity for storing a correspondence table necessary to determine a real mass flow rate.

According to the present invention, a storage means stores beforehand the determined respective relationships of a plurality of discharge coefficient values classified by a physical property value of each of gases with respect to theoretical mass flow rates. Therefore, an identical discharge coefficient relationship can be used for a gas type in which the physical property values of the gases are similar to one another. Accordingly, even when the number of gas types is increased, it is unnecessary to drastically increase the memory capacity for storing a correspondence table necessary to determine a real mass flow rate.

A gas temperature-detecting means detects a surface temperature of a metal structural member having therein a part of a flow passage. Accordingly, it is unnecessary to directly measure the temperature of a fluid. A temperature-detecting element of the temperature-detecting means does not become corroded, and the flow of the gas in the flow passage is not disturbed when the temperature is detected.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 2 illustrates an example of a gas type-physical property value-classification correspondence table;

FIG. 7 is a block diagram illustrating an arrangement of another embodiment of the present invention.

DESCRIPTION OF THE PREFERRED EMBODIMENTS

An embodiment of the present invention will be explained below with reference to the drawings.

Figure 1:
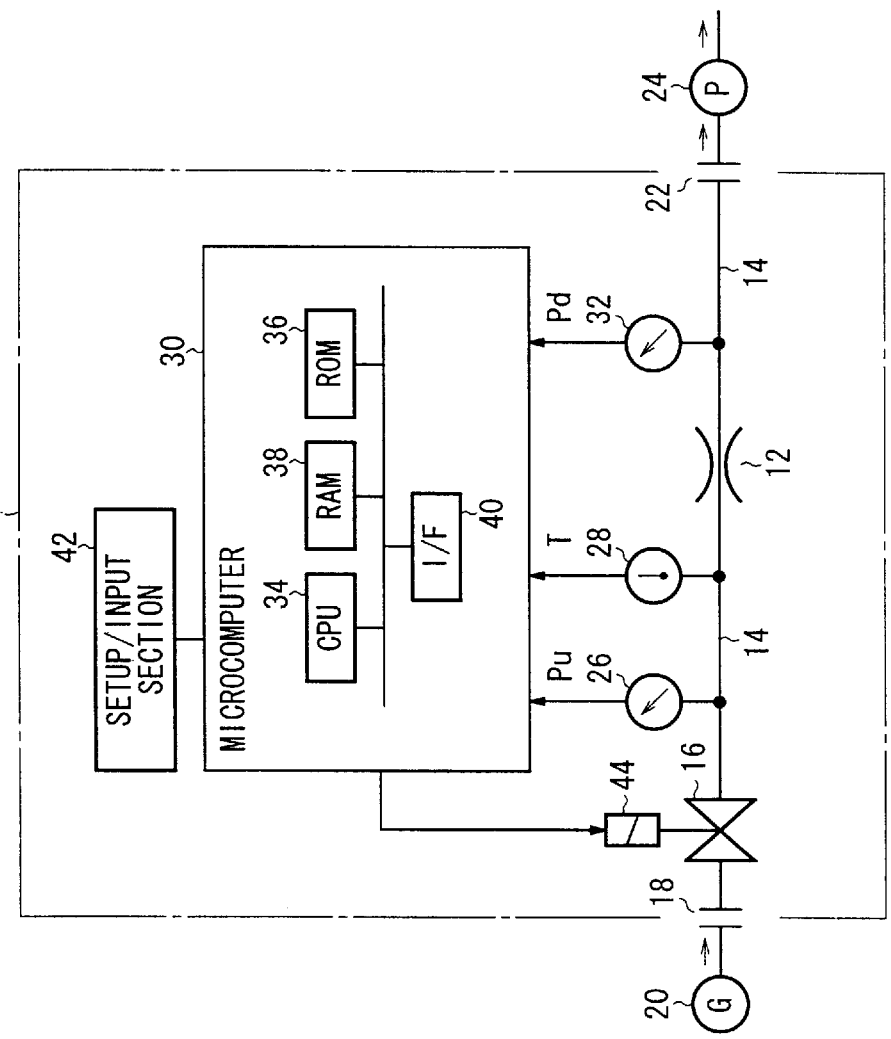
FIG. 1 is a block diagram illustrating an arrangement of an embodiment of the present invention.

FIG. 1 shows a schematic arrangement of a mass flow rate control apparatus 10 for carry ng out a mass flow rate-measuring method according to an embodiment of the present invention.

The mass flow rate control apparatus 10 has a flow passage 14. An orifice 12 is inserted into the flow passage 14 and functions as a fixed throttle to operate as a sonic nozzle. The orifice 12 of the present embodiment is an orifice for producing a flow rate of 100 cc/mm and having a diameter of 0.18 mm.

A control valve 16, which serves as the pressure-varying means, is arranged in the flow passage 14 on the upstream side of the orifice 12. The control valve 16 is communicated with a gas supply source 20 via an input port 18 disposed on the upstream side.

Downstream of the orifice 12, the flow passage 14 is connected to a vacuum pump 24 via an output port 22.

A pressure sensor 26 as the upstream pressure-detecting means for detecting the upstream pressure Pu, and a temperature sensor 28 as the gas temperature-detecting means for detecting the gas temperature T are arranged in the flow passage 14 on the upstream side of the orifice 12. Outputs of the pressure sensor 26 and the temperature sensor 28 are supplied to a microcomputer 30 as the control means.

A pressure sensor 32 as the downstream pressure-detecting means for detecting the downstream pressure Pd is arranged downstream of the orifice 12 in the flow passage 14. An output of the pressure sensor 32 is also supplied to the microcomputer 30.

The microcomputer 30 is a calculating machine. The microcomputer 30 has CPU (central processing unit) 34, ROM (read only memory, including EEPROM) 36 as the storage means as a memory, RAM (random access memory) 38, an interface (I/F) 40 including, for example, an A/D converter (analog to digital converter), a D/A converter (digital to analog converter), and I/O (input/output), and other components including, for example, a timer as the time-measuring means. The microcomputer 30 functions, for example, as a control unit, a calculating unit, and a processing unit.

The outputs of the pressure sensors 26, 32 and the temperature sensor 28 are converted into the upstream pressure Pu, the downstream pressure Pd, and the gas temperature T as digital data by using the A/D converter of the interface 40 of the microcomputer 30, and the data are stored in RAM 38.

A setup/input section 42 for inputting/setting-up the gas type and the target mass flow rate (hereinafter referred to as "Qta") is connected to the microcomputer 30.

The microcomputer 30 performs predetermined processing as described later on, based on the inputted gas type, the target mass flow rate Qta, and the detected upstream pressure Pu, the gas temperature T, and the downstream pressure Pd. The microcomputer 30 varies the opening degree of the control valve 16 by using a driver 44 and the D/A converter of the interface 40 based on the obtained result of the processing. Therefore, the real mass flow rate Qtr of the gas flowing through the flow passage 14 coincides with the target mass flow rate Qta.

Figure 3:
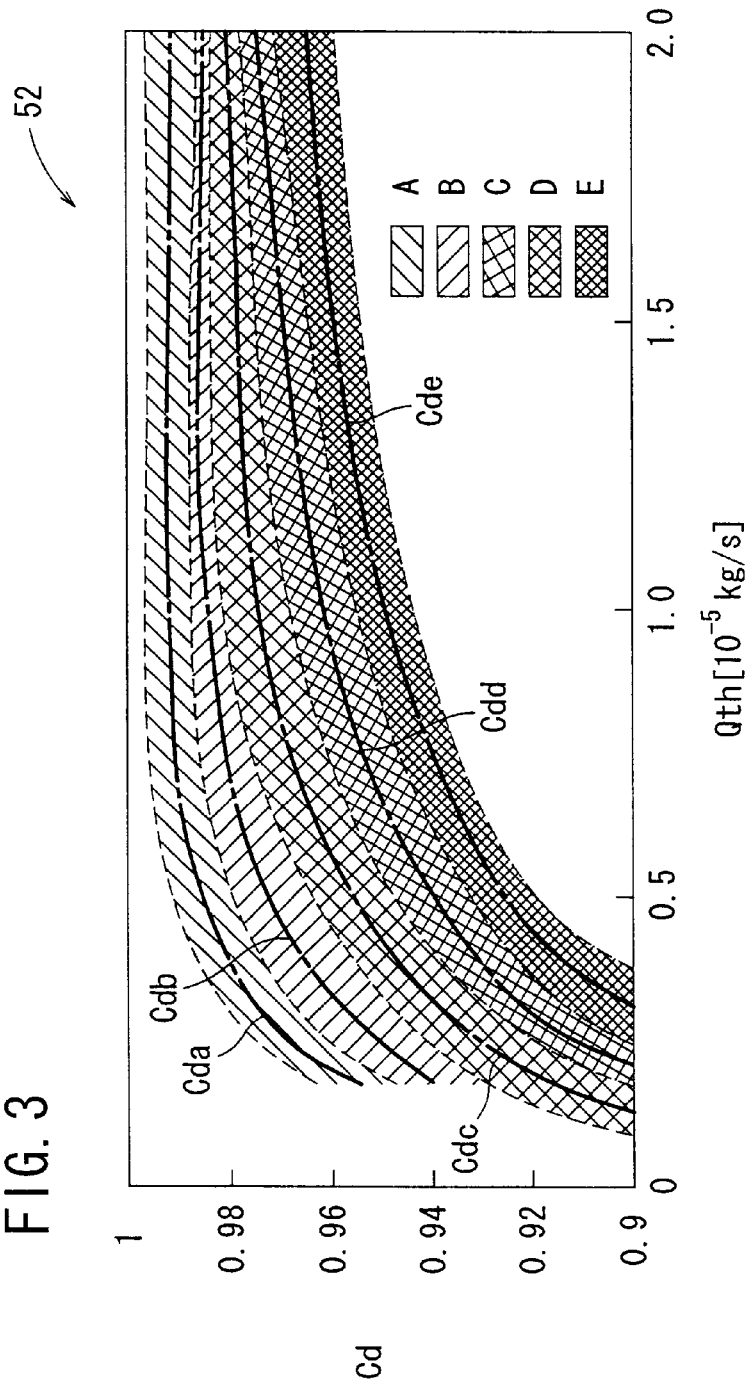
FIG. 3 illustrates a theoretical mass flow rate-discharge coefficient correspondence table.

A control program as well as a gas type-physical property value-classification correspondence table 50, shown in FIG. 2, and a theoretical mass flow rate-discharge coefficient correspondence table 52, shown in FIG. 3, are previously recorded in ROM 36 so that they are capable of being updated.

The gas type-physical property value-classification correspondence table 50 shown in FIG. 2 stores the gas type including, for example, air (AIR), nitrogen ($N_2$), argon (Ar), and tetrafluoroethylene ($CF_4$), the specific heat ratio k (ratio between the specific heat at constant pressure and the specific heat at constant volume) as the physical property value of each of the gas types, and the classification α (α=A to D . . . ) indicating the respective relationships with respect to each of the classifications A, B, C, D, E depicted in the theoretical mass flow rate-discharge coefficient correspondence table 52 shown in FIG. 3.

The theoretical mass flow rate-discharge coefficient correspondence table 52 show in FIG. 3 stores (registers) the classifications α (α=A to D . . . ) as a class separation, and the characteristics of the discharge coefficient relationships Cda to Cde as the representative characteristics of the respective classification regions A, B, C, D, E. The classifications α and the discharge coefficient relationships Cda to Cde can be also stored with approximate expressions of polynomial expressions. In the embodiment, the classifications α as the class separation include the five classifications. However, the number of classifications may be changed for use. The discharge coefficient relationships Cda to Cde as the representative characteristics reside in curves depicted along central values of the respective classification regions A to E.

Explanation will be made of a method for preparing the gas type-physical property values-classification correspondence table 50 shown in FIG. 2 and the theoretical mass flow rate-discharge coefficient correspondence table 52 shown in FIG. 3, or in other words, the steps of determining the respective relationships Cda to Cde of the plurality of discharge coefficients Cd with respect to the theoretical mass flow rates Qth, the plurality of discharge coefficients Cd being classified by the physical property value of the gas flowing through the flow passage 14 in which the orifice 12, which operates as a sonic nozzle having a known cross-sectional area, is connected in series.

Figure 4:
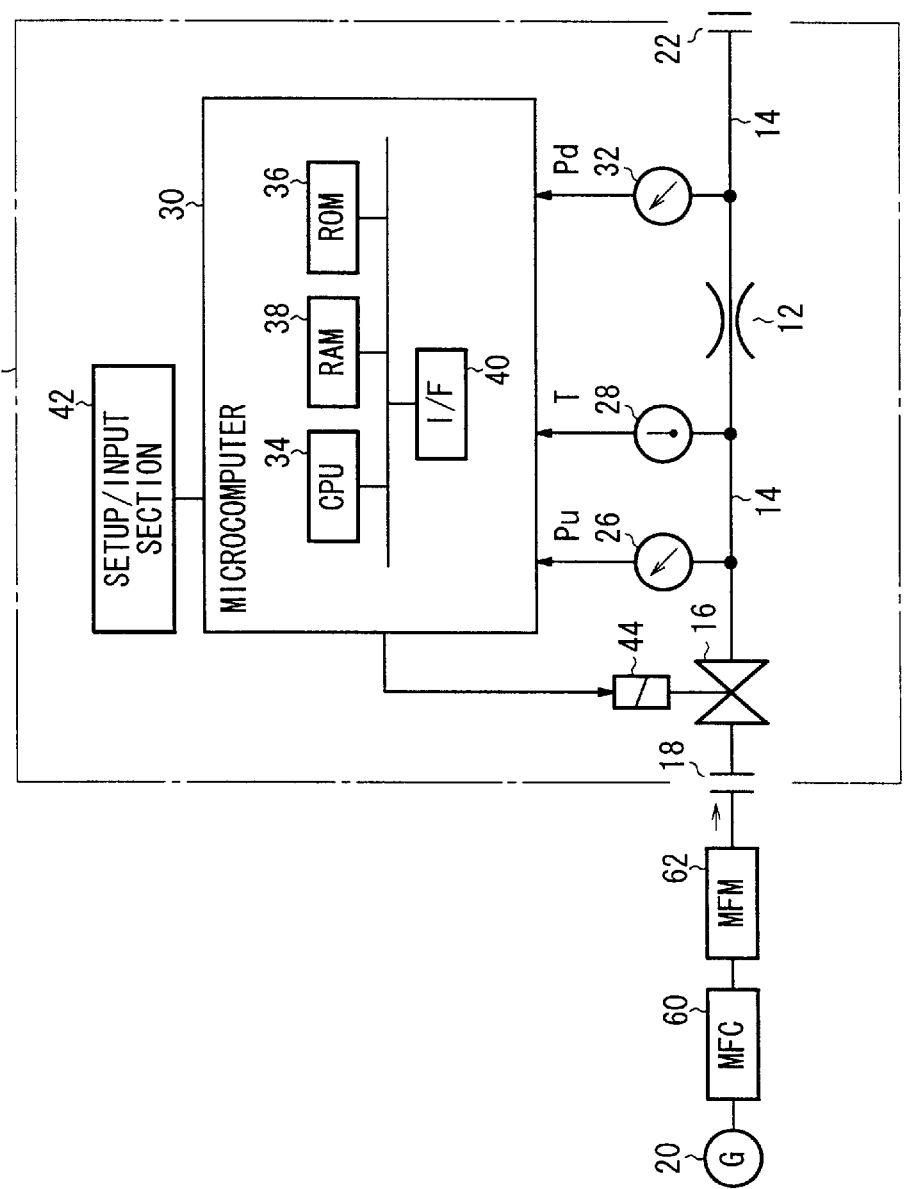
FIG. 4 is a block diagram illustrating an apparatus to be used for preparing the theoretical mass flow rate-discharge coefficient correspondence table.

As shown in FIG. 4, a mass flow controller 60 and a mass flow meter 62 are connected in series between the gas supply source 20, for supplying the gas as the measurement objective, and the input port 18.

Subsequently, the flow rates are successively set up within a measurement range with the mass flow controller 60 for each of the gases as the measurement objectives. For example, the flow rates of 10%, 20%, 30%, . . . 80%, 90%, 100% are successively set up.

The gas as the measurement objective includes, for example, air (AIR), nitrogen ($N_2$), argon (Ar), tetrafluoroethylene ($CF_4$), and carbon dioxide ($CO_2$).

Subsequently, when the value of the mass flow meter 62 is stabilized during setting up of each of the flow rates of the respective gases, the following quantities of state are measured.

That is, the real mass flow rate Qtr is measured by the mass flow meter 62, the upstream pressure Pu is measured by the pressure sensor 26, the gas temperature T on the upstream side is measured by the temperature sensor 28, and the downstream pressure Pd is measured by the pressure sensor 32.

Subsequently, the theoretical mass flow rate Qth at each point of time of the measurement is calculated from the measured data by the following expression (1).

$$Qth = A \cdot Pu \cdot (2/(k+1))^{1/(k-1)} \cdot [(k/(k+1)) \cdot (2/(R \cdot T))]^{1/2} \quad (1)$$

A represents the effective cross-sectional area [$m^2$] of the orifice 12, k represents the specific heat ratio, and R represents the gas constant [J/kg·K].

Subsequently, as represented by the following expression (2), the discharge coefficient Cd is calculated as a value obtained by dividing the real mass flow rate Qtr measured with the mass flow meter 62 by the theoretical mass flow rate Qth at each point of time during measurement.

$$Cd = Qtr/Qth \quad (2)$$

Figure 5:
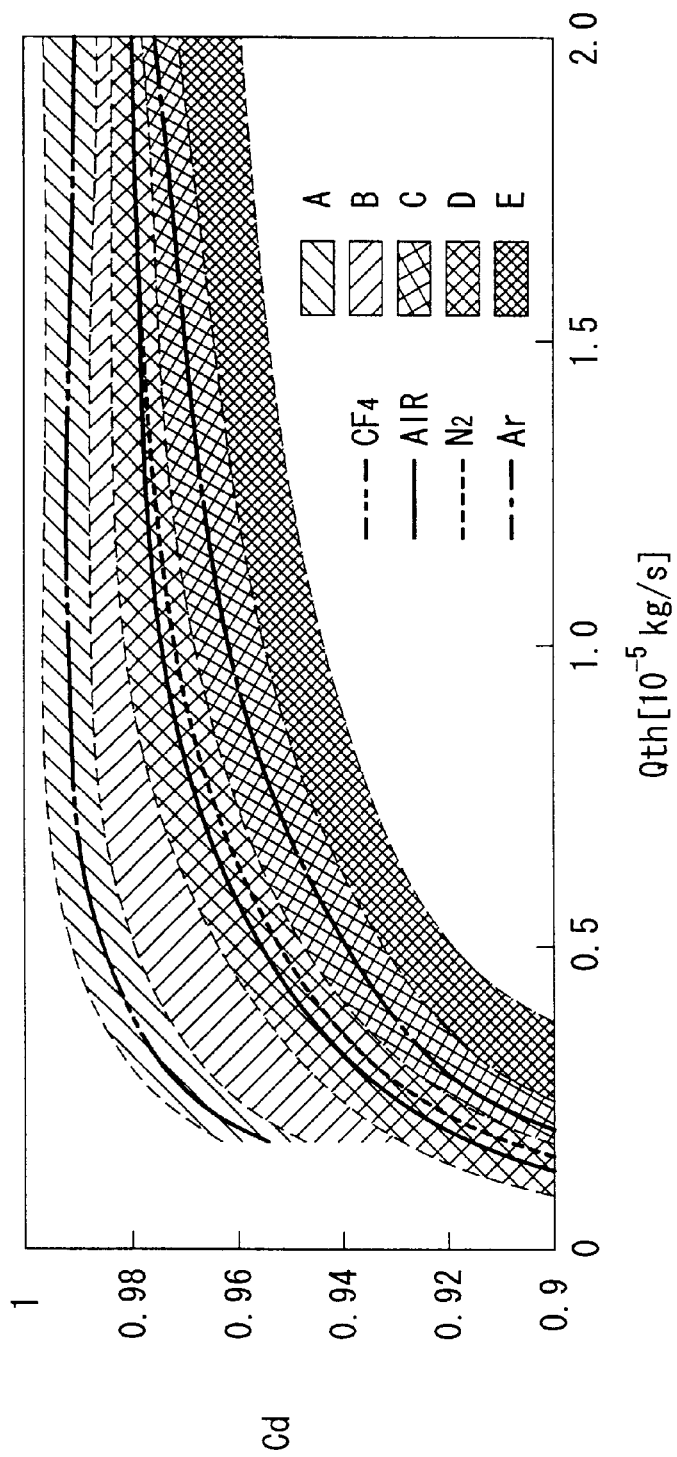
FIG. 5 illustrates an example of practical measurement of the discharge coefficient.

FIG. 5 shows exemplary characteristics of the theoretical mass flow rate Qth and the discharge coefficient Cd for the plurality of gases determined by the procedure as described above by using the apparatus shown in FIG. 4.

With reference to FIG. 5, it is appreciated that tetrafluoroethylene gas $CF_4$ is classified into the classification A, air (AIR) and nitrogen gas $N_2$ are classified into the classification C, and argon gas Ar is classified into the classification D. As described above, the gas type-physical property value-classification correspondence table 50 shown in FIG. 2 and the theoretical mass flow rate-discharge coefficient correspondence table 52 are prepared from the determined discharge coefficient Cd and the classification α, and they are stored in ROM 36. The specific heat ratio k is known provided that the type of the gas is known.

Figure 6:
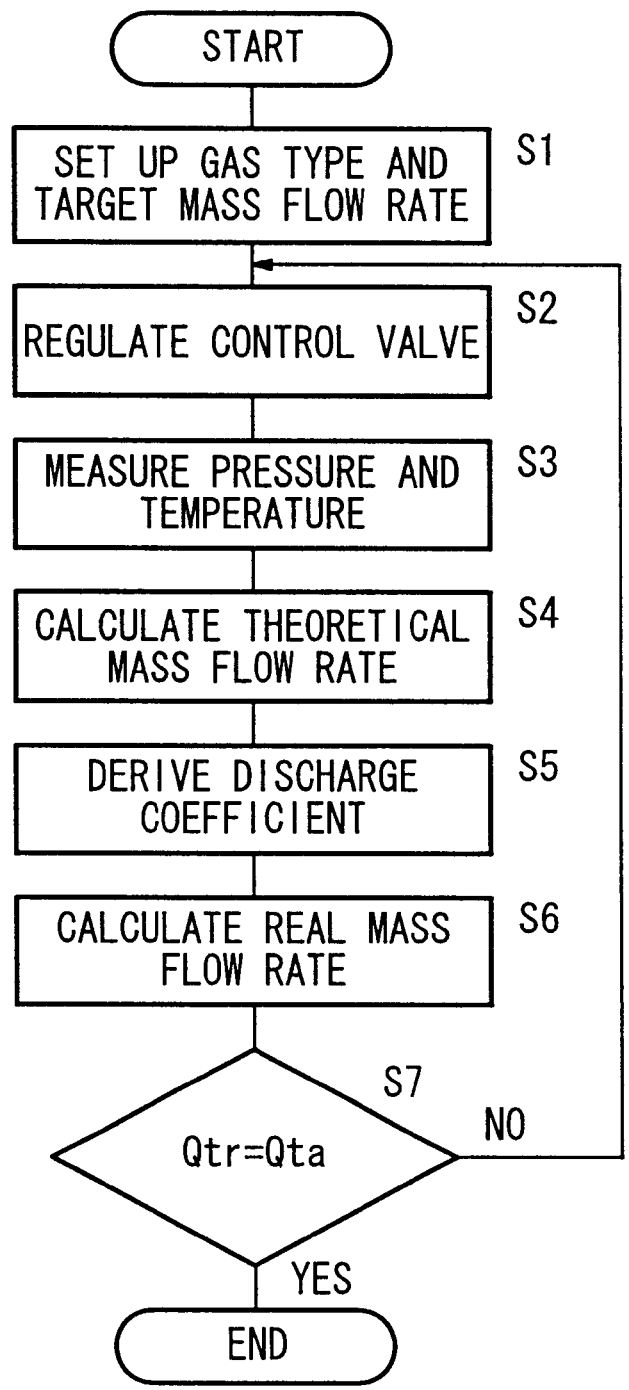
FIG. 6 is a flow chart for illustrating the operation of the exemplary arrangement shown in FIG. 1.

Operation of the present embodiment will be explained in detail below based on a flow chart of an application program shown in FIG. 6. The control device is CPU 34 unless otherwise noted.

In Step S1, the gas type whose flow rate is controlled is inputted from the setup/input section 42 shown in FIG. 1. Further, the target mass flow rate Qta is inputted. Accordingly, the inputted data are stored in a predetermined area in RAM 38.

In Step S2, CPU 34 sets up the opening degree of the control valve 16 to a value near the target mass flow rate Qta by using the driver 44. Accordingly, the gas, which is set up by the setup/input section 42, is supplied from the gas supply source 20 to the input port 18 in the mass flow rate control apparatus 10.

The gas, which has been supplied to the mass flow rate control apparatus 10, is supplied to the flow passage 14 on the downstream side via the input port 18, the control valve 16, the flow passage 14 on the upstream side, and the orifice 12. The gas is supplied via the output port 22 to the vacuum pump 24 arranged on the output side of the mass flow rate control apparatus 10.

In Step S3, the upstream pressure Pu, the downstream pressure Pd, and the gas temperature T on the upstream side are measured by the respective pressure sensors 26, 32 and the temperature sensor 28, and the measured values are stored in RAM 38, on condition that the upstream pressure Pu and the downstream pressure Pd, which are monitored by the pressure sensors 26, 32, are stabilized.

In Step S4, it is confirmed that the value, which is obtained by dividing the downstream pressure Pd by the upstream pressure Pu, is not more than the critical pressure ratio (in order to confirm whether or not the mass flow rate control apparatus 10 is operated normally). On condition that the value is not more than the critical pressure ratio, i.e., on condition that the orifice 12 is operated as a sonic nozzle, the theoretical mass flow rate Qth is calculated by the expression (1) (previously stored in ROM 36). The specific heat ratio k in the expression (1) is known by making reference to the gas type-physical property value-classification correspondence table 50 based on the type of the gas set up and inputted in Step S1. The value, which is previously stored in ROM 36, can be used for the gas constant R.

In Step S5, the value of the discharge coefficient Cd, which corresponds to the theoretical mass flow rate Qth determined by the calculation from the characteristic of the corresponding discharge coefficient Cd of the characteristics of the five discharge coefficient relationships Cda to Cde, can be determined by making reference to the theoretical mass flow rate-discharge coefficient correspondence table 52 shown in FIG. 3 with the parameters of the determined theoretical mass flow rate Qth and the classification α based on the physical property value of the gas flowing through the flow passage 14 (the classification α is known by making reference to the gas type-physical property value-classification correspondence table 50, from the set up and inputted type of gas). That is, when the gas type is classified into the classification A, reference is made to the characteristic of the discharge coefficient relationship Cda shown in FIG. 3 to derive the value of the discharge coefficient Cd plotted along the vertical axis corresponding to the theoretical mass flow rate Qth plotted along the horizontal axis.

The present real mass flow rate Qtr of the gas flowing through the flow passage 14 is determined by the following expression (3) obtained by solving the expression (2) with the derived discharge coefficient Cd and the theoretical mass flow rate Qth, i.e., according to the product of the discharge coefficient Cd and the theoretical mass flow rate Qth.

$$Qtr = Cd \cdot Qth \qquad (3)$$

In Step S7, it is judged whether or not the present real mass flow rate Qtr determined as described above is coincident with the target mass flow rate Qta. If the present real mass flow rate Qtr is not coincident with the target mass flow rate Qta, the processing including the regulation of the control valve 16 and the followings in Steps S2 to S6 is executed until the present real mass flow rate Qtr is coincident with the target mass flow rate Qta.

Practically, after the judgment in Step S7 holds, the judging process in Step S7 is performed at intervals of a certain period of time to effect monitoring so that the real mass flow rate Qtr is coincident with the target mass flow rate Qta. If the both are deviated from each other, the processing including Step S2 and the following steps is reexecuted.

According to the above embodiment, as shown in FIG. 3, the plurality of discharge coefficient relationships Cda to Cde classified (α, the five classifications in this embodiment) by the physical property value (for example, the specific heat ratio k) of the gas with respect to the theoretical mass flow rates Qth are determined in advance. Therefore, the identical discharge coefficient relationship can be used for the gas type in which the physical property values of the gases are similar to one another. Even when the number of gas types is increased, it is enough that the appropriate classification, which includes the gas, is stored in the classification column in the gas type-physical property value-classification correspondence table 50 shown in FIG. 2. It is unnecessary to possess a new characteristic of the discharge coefficient Cd corresponding to the added gas. Therefore, it is unnecessary to unduly increase the memory capacity for storing the correspondence table required to determine the real mass flow rate Qtr.

FIG. 7 shows an arrangement of a mass flow rate control apparatus 10A according to another embodiment of the present invention. The mass flow rate control apparatus 10A is different from the mass flow rate control apparatus 10 shown in FIG. 1 in that a part of the flow passage 14 on the upstream side of the orifice 12 is formed with a metal structural member 54 based on a block made of stainless steel or the like.

The metal structural member 54 has a large heat capacity, and it has good thermal conductivity. Therefore, once the temperature has arrived at an equilibrium state, the surface temperature is equal to the temperature of the gas flowing through the flow passage 14 formed in the metal structural member 54.

Therefore, as shown in FIG. 7, when the surface temperature of the metal structural member 54 is detected by the temperature sensor 28, the temperature of the gas can be measured.

It is therefore unnecessary to directly detect the temperature of the gas as a fluid by means of the temperature sensor 28, preventing a temperature-detecting element of the temperature sensor 28 from becoming corroded and preventing the flow of the gas in the flow passage 14 from being disturbed when the temperature is detected.

The present invention is not limited to the above embodiments, and the invention may be embodied in other various forms without deviating from the gist or essential characteristics of the present invention.

According to the present invention, the real mass flow rate can be measured with a small memory capacity even when the type of the gas differs.

Further, when representative discharge coefficient relationships are registered, the real mass flow rate can be efficiently calculated at a definite accuracy for a variety of types of gases.

Furthermore, according to the present invention, a mass flow rate control apparatus is provided, in which the temperature-detecting element of the temperature-detecting means does not become corroded even when the gas is corrosive, and the flow of the gas in the flow passage is not disturbed.

What is claimed is:

1. A mass flow rate-measuring method for measuring a real mass flow rate of a gas flowing through a flow passage in which a sonic nozzle having a known cross-sectional area is connected in series, said mass flow rate-measuring method comprising the steps of:

storing a correspondenc table which defines a plurality of respective relationships between discharge coefficient values and theoretical mass flow rates, wherein said respective relationships are classified within respective regions in said correspondence table by a physical property value which is common to multiple gases, and wherein said discharge coefficient values define a relationship between said real mass flow rate and a theoretical mass flow rate through said flow passage;

measuring a pressure and a temperature of said gas on an upstream side of said sonic nozzle when said real mass flow rate of said gas flowing through said flow passage is measured;

determining said theoretical mass flow rate based on said physical property value of said gas flowing through said flow passage and said measured pressure and temperature;

determining said discharge coefficient by making reference to said correspondence table with parameters of said determined theoretical mass flow rate and said physical property value of said gas flowing through said flow passage; and determining said real mass flow rate by obtaining a product of said determined discharge coefficient and said theoretical mass flow rate.

2. The mass flow rate-measuring method according to claim 1, wherein said physical property value of said gas is a specific heat ratio.

3. The mass flow rate-measuring method according to claim 1, wherein said gas includes at least two gases of air, nitrogen, argon, and carbon dioxide.

4. The mass flow rate-measuring method according to claim 1, wherein each of said respective relationships are representative of other discharge coefficient relationships for other gases having the same physical property.

5. A mass flow rate control apparatus comprising an orifice having a known cross-sectional area interposed in a flow passage for supplying, to a supply objective, a gas supplied from a gas supply source, a pressure-varying means disposed in said flow passage after said gas supply source and arranged on an upstream side of said orifice, an upstream pressure-detecting means and a gas temperature-detecting means arranged on said upstream side of said orifice, and a downstream pressure-detecting means arranged on a downstream side of said orifice, said mass flow rate control apparatus further comprising:

a storage means for storing a correspondence table which defines a plurality of respective relationships between discharge coefficient values and theoretical mass flow rates, wherein said respective relationships are classified within respective regions in said correspondence table by a physical property value which is common to multiple gases, and wherein said discharge coefficient values define a relationship between said real mass flow rate and a theoretical mass flow rate through said flow passage; and a control means for varying said pressure-varying means based on a gas type, a target mass flow rate, and an upstream pressure, a gas temperature, and a downstream pressure detected by said respective detecting means to make control so that a real mass flow rate of said gas flowing through said flow passage coincides with said target mass flow rate, wherein said theoretical mass flow rate is determined by said control means after confirming operation of said orifice at a ratio of not more than a critical pressure ratio when said gas type and said target mass flow rate are given, said discharge coefficient is determined by making reference to said correspondence table in said storage means with parameters of said determined theoretical mass flow rate and said physical property value of said gas flowing through said flow passage, said real mass flow rate is determined by obtaining a product of said determined discharge coefficient and said determined theoretical mass flow rate, and said pressure-varying means is feedback-controlled so that said determined real mass flow rate coincides with said target mass flow rate.

6. The mass flow rate control apparatus according to claim 5, wherein said gas temperature-detecting means detects a surface temperature of a metal structural member having a part of said flow passage.

7. The mass flow rate control apparatus according to claim 5, wherein said physical property value of said gas is a specific heat ratio.

8. The mass flow rate control apparatus according to claim 5, wherein said gas includes at least two gases of air, nitrogen, argon, and carbon dioxide.

9. The mass flow rate control apparatus according to claim 5, wherein each of said respective relationships are representative of other discharge coefficient relationships for other gases having the same physical property.

* * * * *